Feb. 2, 1943. H. S. BERG 2,309,820
BEARING PACKER
Original Filed July 3, 1939
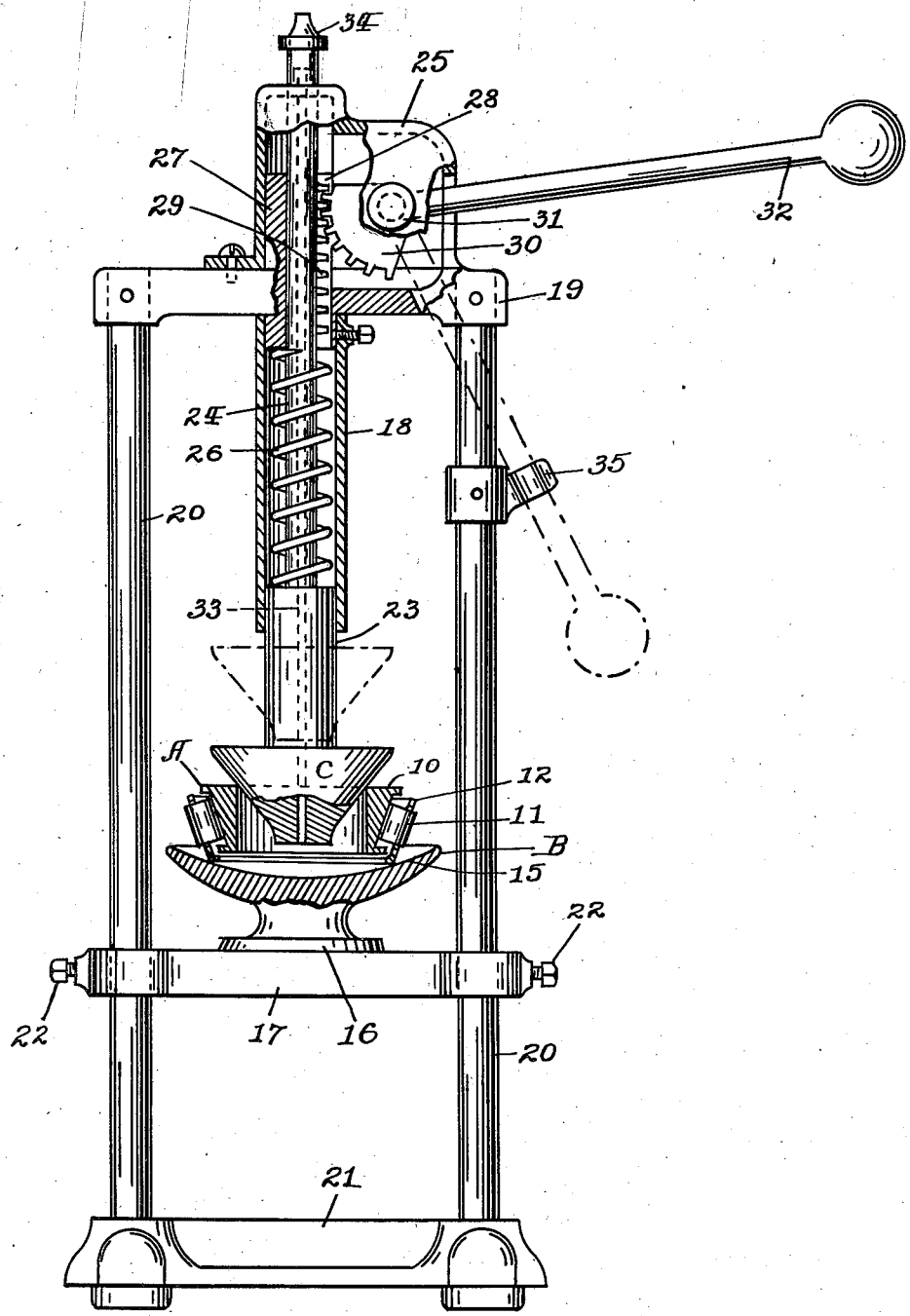
INVENTOR.
Hans S. Berg,
BY
Attorney.

Patented Feb. 2, 1943

2,309,820

UNITED STATES PATENT OFFICE 2,309,820

BEARING PACKER

Hans S. Berg, Ventura, Calif.

Original application July 3, 1939, Serial No. 282,669. Divided and this application May 26, 1941, Serial No. 395,175

5 Claims. (Cl. 184—1)

My invention relates to the art of lubricating bearings and more particularly to an improved bearing packer for lubricating roller and ball bearings with a heavy or semi-solid lubricant. The primary object of my invention is to provide simple and inexpensive improved means for easily, quickly and thoroughly lubricating bearing assemblies of any usual size or construction substantially without waste of lubricant. Further object is to provide means for quickly and effectively clamping a bearing assembly to be treated in a holder so that fresh lubricating medium can be injected into the bearing while the bearing is purged of old lubricant. A further object is to prevent waste of lubricant and to enable the operator to use the lubricating device without soiling the hands and clothing.

As is well known, roller and ball bearing assemblies consist of an inner ring having equally spaced rollers or balls held therein by means of an outer retaining ring or cage. Likewise the usual method of applying lubricant to these bearing assemblies has been to force grease or other semi-solid lubricant either by hand or by the use of packing devices between the rollers or balls before or after the bearing assembly is applied in use. With my improvement the semi-solid lubricant is applied under pressure while the bearing assembly is out of use. The bearing, of roller or ball type, is held firmly in a suitable holder below a readily manipulated nozzle or applicator, whereby a tight connection is made with the bearing assembly while the hands of the operator are left free to apply lubricant, under pressure, to effectively pack the bearing assembly.

This application is a division of my companion application, filed July 3, 1939, bearing Serial Number 282,669, which matured into Patent No. 2,248,940, July 15, 1941.

The accompanying drawing forming part of this specification is a front elevation, partly in central vertical section of my improved bearing packer, the elevated position of the nozzle and the relative lowered position of the handle bar being shown in broken lines.

My invention is adapted for packing various types and sizes of antifriction roller or ball bearing assemblies, A representing one form which is commonly used in front wheels of automobiles. The bearing assembly shown consists of an inner annulus 10 and an outer concentric spacing ring or cage 12 between which an annular series of antifriction rollers 11 are retained.

In the drawing, B indicates a holder resembling a shallow bowl or cup 15, having an inwardly sloping floor upon which a bearing assembly A of any size within the range of the apparatus is held with the lower edge of its ring 12 tightly seated while the bearing assembly is being packed with lubricant. This bowl has a base 16 which is placed upon a suitable supporting table 17. A vertical cylindrical guide 18, centrally positioned above the bowl is supported by a superimposed yoke 19. This yoke is rigidly mounted upon vertical supporting rods 20 of any suitable number. These rods are supported by a suitable base 21 and the supporting table 17 is slidable vertically on the rods and secured thereto at selected elevation by the set bolts 22. A plunger 23 is reciprocably held in the cylindrical guide 18 and is provided with a downwardly tapering nozzle or adapter C on its lower end and with an upwardly extending stem 24 on its upper end. The stem projects upwardly through the housing 25 on the yoke 19. A helical expansion spring 26 in the guide 18 and loosely enveloping the stem 24 urges the plunger 23 with its nozzle C down tightly engaging and closing the annulus 10, thus holding the bearing assembly with its outer cage ring 12 tight upon the floor of bowl B. A back stop 27 for the upper end of the spring 26 is placed in the guide 18 and housing 25. This back stop is integral with yoke 19 and has a vertical channel 28 in which the vertical toothed rack 29 on the side of the stem 24 and an intermeshing toothed pinion 30 work. The pinion 30 is journaled by the stud shaft 31 in the housing 25 and has an actuating hand lever 32. By swinging the hand lever down into the broken line position, the plunger is easily raised to release the nozzle from the bearing assembly. The nozzle is retained in raised position to free the bearing assembly by a spring clasp 35 on one of the supporting rods 20 which releasably engages the hand lever 32. The plunger including its nozzle and stem are passaged longitudinally at 33 for forcing heavy or semi-solid lubricant or a washing solution into the bearing assembly when the latter is held in the bowl by the nozzle. An adapter 34 of any suitable desired type is provided on the upper extremity of the stem for coupling with a forced lubricant feed supply.

The bowl is selectively positioned in elevation below the nozzle by the adjustable supporting table 17 which provides for variation in spring pressure applied by nozzle C upon the annulus 10 and assists in regulating the space between the bowl and nozzle so as to accommodate different heights and diameters of bearing assemblies which are packed by the device.

In accordance with the patent statutes, I have described the principles of operation of my invention together with the apparatus which I now consider to represent the best embodiment thereof, but I desire to have it understood that the construction shown is only illustrative and that the invention can be carried out by other means and applied to uses other than those above set forth within the spirit of the invention and within the scope of the following claims.

I claim:

1. A bearing assembly packer, comprising, a bowl having an inwardly sloping floor, an upwardly extending guide above the bowl, a support for said bowl and guide, a plunger reciprocable in said guide having a stem projecting upwardly from the guide and a nozzle on its lower end adapted in its lowered position to engage and close the upper end of the inner member of a bearing assembly and hold the latter with its outer member tightly seated upon the floor of said bowl, resilient means cooperating with said guide and plunger for urging the plunger with its nozzle downwardly, said plunger including its nozzle and stem being passaged longitudinally for injecting lubricant under pressure downwardly into the space within the bearing assembly, a rack and pinion connected with said plunger for reciprocating the latter to raise and lower said nozzle and permit the resilient means to assist in lowering and holding the nozzle in lowered position upon the bearing assembly and lever actuating means for revolving said pinion to raise or lower said plunger.

2. A bearing assembly lubricating packer, comprising, a bowl, an upwardly extending guide above the bowl, a support for said bowl and guide, a plunger reciprocable in said guide having a stem projecting upwardly from the guide and a nozzle on its lower end adapted in its lowered position to engage and close the upper end of the inner member of a bearing assembly and hold the latter with its outer member tightly seated in said bowl, resilient means cooperating with said guide and plunger for urging the plunger with its nozzle down, said plunger including its nozzle and stem being passaged longitudinally for injecting lubricant under pressure downwardly into the space within the bearing assembly, a gear connection with said plunger for reciprocating the latter to raise and lower said nozzle and permit the resilient means to assist in lowering and holding the nozzle in lowered position upon the bearing assembly and having a drive pinion, a hand piece for actuating said pinion to cause the reciprocation of said plunger, and an engaging element on said support for releasably retaining the hand piece with the plunger in raised position.

3. A bearing assembly lubricating packer, comprising, a bowl, an upwardly extending guide above said bowl, a frame for supporting said guide, a plunger reciprocable upon said guide having a nozzle on its lower end adapted in its lower position to engage and close the upper end of the inner member of a bearing assembly and hold the latter with its outer member tightly seated in said bowl, a support for said bowl adjustable in elevation upon said frame for accommodating bearing assemblies to provide for variations in spring pressure by bearing assemblies of different heights below said nozzle, resilient means cooperating with said guide and plunger for urging the latter into engagement with the bearing assembly, said plunger including its nozzle and stem being passaged longitudinally for admitting lubricant between the parts of the bearing assembly, and means cooperating with said plunger for raising the latter with its nozzle above the bearing assembly in said bowl or for releasing the plunger from superior position into engagement with the bearing assembly.

4. A bearing assembly packer, comprising, a bowl for holding a bearing assembly, an upwardly extending guide above the bowl, a support for said bowl and guide, a plunger reciprocable in said guide having a bearing assembly engaging element on its lower end adapted in the lowered position of the plunger to close the upper end of the inner member of the bearing assembly and hold the latter with its outer member tightly seated in said bowl, resilient means cooperating with said guide and plunger for urging the plunger down upon the bearing assembly, one of said bearing assembly holding elements being passaged to apply lubricant between the parts of the bearing assembly when the latter is held in said bowl by said plunger, a gear connection with said plunger for reciprocating the latter to or forceably close upon and permit the resilient means to hold the plunger closed upon the bearing assembly and having a drive pinion, a hand piece for actuating said pinion to cause the reciprocation of said plunger, and an engaging element cooperating with one of said movable parts for retaining the plunger in raised position.

5. A bearing assembly lubricator, comprising, a bowl, a guide extending upwardly above said bowl, a frame for supporting said guide, a plunger reciprocable in said guide adapted in its lowered position to close by its lower end the inner ring of and cooperating with said bowl to hold a bearing assembly in said bowl, resilient means cooperating with said guide for urging said plunger down, gear actuating means for raising or releasing the plunger to permit the resilient means holding the plunger down, and a supporting table for the bowl adjustable in height upon said frame to provide for variations in pressure exerted by the plunger upon the bearing assembly and to accommodate bearing assemblies held by said bowl of different heights, one of said bearing assembly holding elements being passaged to admit treating medium within the space between the plunger and bowl and within the bearing assembly.

HANS S. BERG.